United States Patent
Pasquier et al.

(10) Patent No.: US 9,034,099 B2
(45) Date of Patent: May 19, 2015

(54) CEMENT THAT IS RESISTANT TO INTERNAL SULFATE REACTIONS AND TO EXTERNAL SULFATE ATTACKS

(75) Inventors: Michel Pasquier, Lyons (FR); Martine Pasquier, legal representative, Lyons (FR); Laetitia Bessette, Saint Clair de la Tour (FR); Francois Hue, Bourgoin Jallieu (FR)

(73) Assignee: VICAT, Paris la Defense (FR)

( * ) Notice: Subject to any disclaimer, the term of this patent is extended or adjusted under 35 U.S.C. 154(b) by 0 days.

(21) Appl. No.: 13/990,013

(22) PCT Filed: Nov. 24, 2011

(86) PCT No.: PCT/FR2011/052744
§ 371 (c)(1),
(2), (4) Date: Jan. 7, 2014

(87) PCT Pub. No.: WO2012/069763
PCT Pub. Date: May 31, 2012

(65) Prior Publication Data
US 2014/0137772 A1    May 22, 2014

(30) Foreign Application Priority Data
Nov. 25, 2010   (FR) ...................... 10 59740

(51) Int. Cl.
*C04B 7/02* (2006.01)
*C04B 7/345* (2006.01)
*C04B 28/02* (2006.01)
*C04B 28/04* (2006.01)

(52) U.S. Cl.
CPC . *C04B 7/02* (2013.01); *C04B 7/345* (2013.01); *C04B 28/02* (2013.01); *C04B 28/04* (2013.01)

(58) Field of Classification Search
CPC ........ C04B 7/02; C04B 7/345; C04B 7/3453; C04B 18/146; C04B 22/143; C04B 28/02; C04B 28/04
USPC ......... 106/735, 736, 737, 739, 693, 733, 768, 106/769, 815
See application file for complete search history.

(56) References Cited

U.S. PATENT DOCUMENTS 4,118,242 A * 10/1978 Kjohl et al. .................. 106/726
8,029,618 B2 * 10/2011 Al-Shafei .................... 106/745

FOREIGN PATENT DOCUMENTS

JP     06100338 A * 4/1994

OTHER PUBLICATIONS

Derwent-Acc-No. 2009-Q75920, abstract of Chinese Patent Specification No. CN 101555105A (Oct. 2009).*
Derwent-Acc-No. 1982-21274E, abstract of Japanese Patent Specification No. JP92-010055 B (Feb. 1982).*

* cited by examiner

*Primary Examiner* — Anthony J Green
(74) *Attorney, Agent, or Firm* — Porzio, Bromberg & Newman, P.C.

(57) ABSTRACT

The present invention relates to a novel cement which makes possible the preparation of concrete, grout or mortar which is resistant to internal sulfate reactions and to external sulfate attacks, and also the use of this cement for the preparation of concrete, grout or mortar.

9 Claims, 2 Drawing Sheets

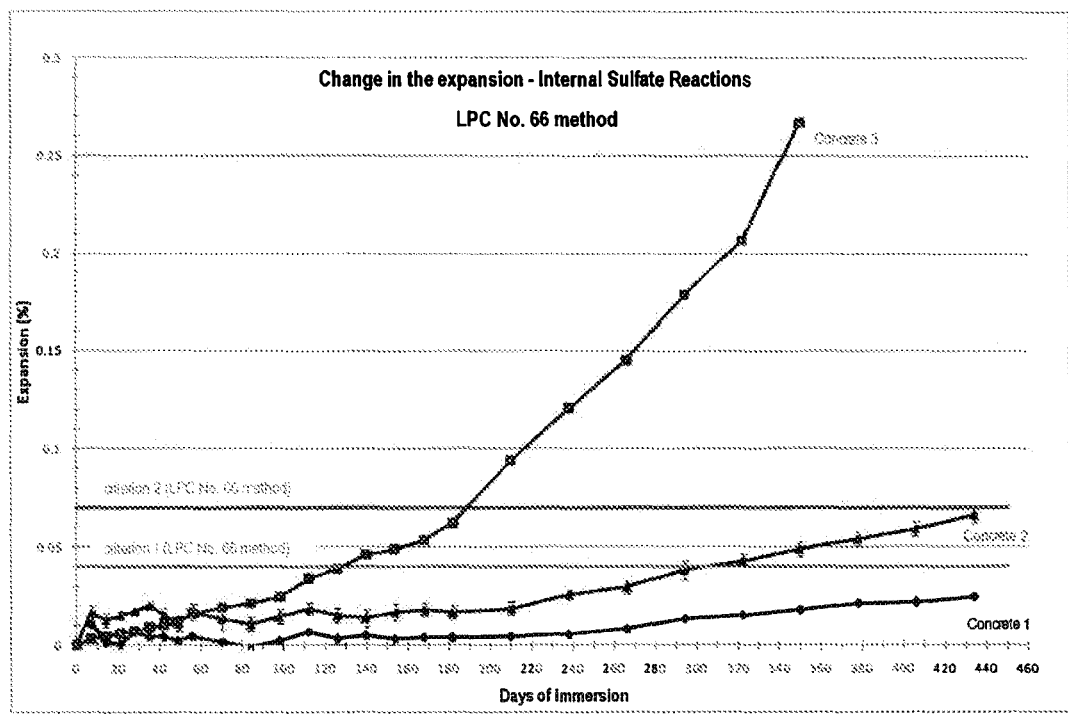
*Figure 1 – Resistance to internal sulfate reactions*

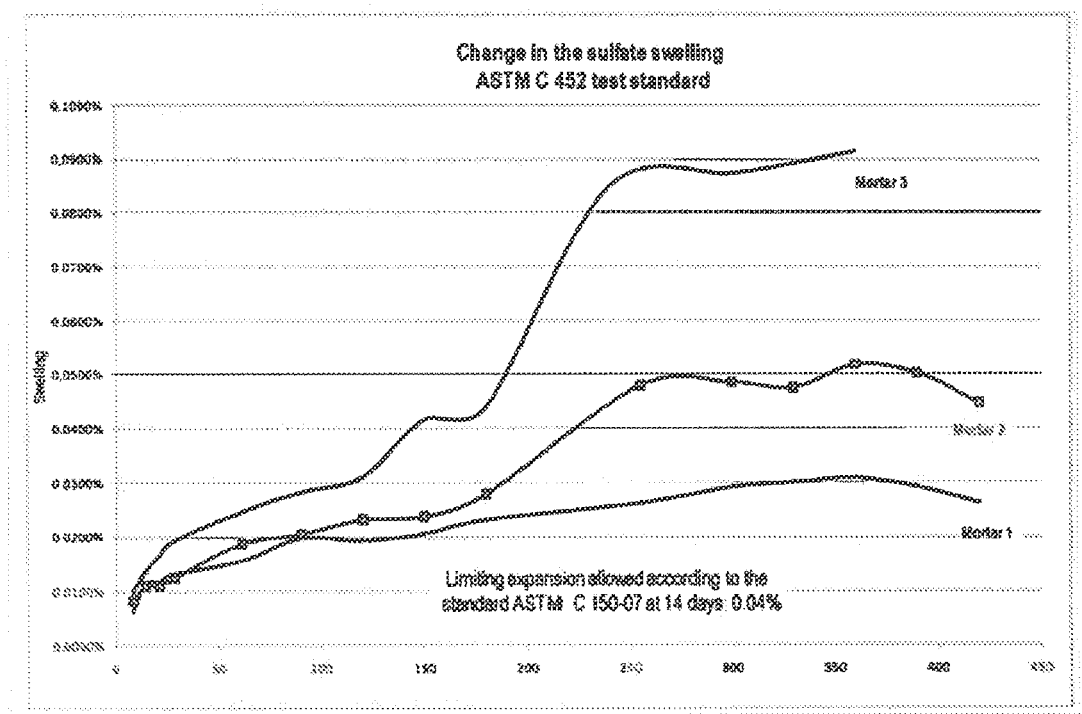
Figure 2 – Resistance to external sulfate attacks

CEMENT THAT IS RESISTANT TO INTERNAL SULFATE REACTIONS AND TO EXTERNAL SULFATE ATTACKS

The present invention relates to a novel cement which makes possible the preparation of concrete, grout or mortar which is resistant to internal sulfate reactions and to external sulfate attacks.

Concrete is a composite construction material manufactured from natural aggregates (sands, gravel) or artificial aggregates (light aggregates) agglomerated by a binder, generally a cement.

Concrete is commonly used for the production of civil engineering structures and buildings and for the manufacture of prefabricated parts. These structural works require a concrete made with a cement which guarantees specific technical and mechanical characteristics, in particular as regards the setting time and the short-times and long-term strength.

The presence of a certain amount of sulfate ($) and of tricalcium aluminate ($C_3A$) in the cement used for the preparation of the concrete is described in the literature as necessary for the maintenance of these technical and mechanical characteristics. Thus, *LEA'S Chemistry of cement and concrete* (4th edition), edited by P. C. Hewlett, pp. 272-273, teaches that an excessively low amount of sulfate results in excessively fast setting (flash set) harmful to the quantity and to the short-term or long-term strength of the concrete. Moreover, it is also taught that an excessively low amount (or the absence) of $C_3A$ results in the appearance of "false set", that is to say of an abnormal and premature stiffening of the cement, a few minutes after it has come into contact with the water.

Ettringite is a mineral entity composed of hydrous calcium aluminum sulfate, of chemical formula $Ca_6Al_2(SO_4)_3(OH)_{12}.26H_2O$. Ettringite is a product of the reaction between tricalcium aluminate $C_3A$, sulfate $ and water. Ettringite can be formed during the setting of the concrete: reference is then made to primary ettringite. The formation of primary ettringite favors the setting of the concrete and does not present any danger for the durability of the latter.

However, it happens that the ettringite is not formed during the setting of the concrete but after the setting. Thus, when the temperature of the concrete is high (greater than 60° C.) at the time of the setting, for example as a result of the exothermicity of the reaction, the primary ettringite is formed and then redissolves or is not formed. Nevertheless, all the reactants necessary for the formation of ettringite ($C_3A$, $, water) remain present in the solidified concrete. After returning to ambient temperature and in a propitious environment, the ettringite can then precipitate in the form of crystals in the already hardened concrete: reference is then made to delayed ettringite. The reaction resulting in the formation of ettringite under these conditions is commonly denoted by International Sulfate Reaction (ISR) or Delayed Ettringite Formation (DEF).

The delayed ettringite can be formed several years after the structural work has been completed. The expansion is then responsible for major disorders in the structure of the concrete which are reflected visually by the appearance of cracks capable of severely damaging said concrete and thus the structural work. The cracking observed can take the form of a multidirectional network and the cracks can open out as far as several millimeters.

The first recognized cases of internal sulfate reaction date from 1987. They appeared on prefabricated railroad ties made of concrete which had been subjected to a heat treatment. Many countries were concerned, in particular Finland, Germany, the Czech Republic, Australia, South Africa, the United States or Sweden.

Other cases appeared in massive cast-in-place concrete castings. This is the case, for example, in the United States, in Great Britain and in Italy.

The disorders were observed between three and ten years after the castings were constructed.

This phenomenon was observed in France from 1997 on bridges, the concrete of which had been cast in place. It essentially concerns parts of massive structural works (piers, joists on piers or abutments, and the like) in contact with water or subjected to high humidity. To date, more than sixty structural works are affected, approximately ten of which are prefabricated parts.

In the face of this major problem, various solutions have been envisaged.

A first solution consists in preparing cements comprising mineral additives, such as ground blast furnace slag or fly ash, in high proportions. These additions make it possible to dilute the clinker and to limit the risks of internal sulfate reaction and their intensity. However, the concretes prepared from these cements are more difficult to handle and their technical performance is weakened. Specifically, problems of setting are regularly encountered, the setting time being too long and the rate of rise in strength being too slow. Furthermore, the mechanical characteristics of the concretes thus prepared, such as, for example, the early compressive strength, have deteriorated in comparison with the concrete prepared from an admixture-free cement. Moreover, the concretes thus prepared are more sensitive to freezing/thawing cycles.

The cements thus prepared thus do not correspond to the technical specifications necessary for the construction of civil engineering structural works or of buildings comprising massive castings in contact with water or subjected to a very humid environment.

A second solution consists in using cement of CEM I ES type according to the standard NF P 15-319 (hydraulic binders—cements for works in water having a sulfate content—denoted by ES). Some cements corresponding to this standard comprise 2.7% of $C_3A$ (value calculated by the Bogue calculation as defined in *LEA'S Chemistry of cement and concrete* (4th edition), edited by P. C. Hewlett, p. 154) and 2.25% of $. However, the use of these cements has not made it possible to prevent the formation of delayed ettringite due to internal sulfate reactions in the concretes thus prepared.

Moreover, the use of these cements does not make it possible to sufficiently limit external sulfate attacks, that is to say the contributions of sulfate by liquid and/or gases infiltrating the concrete and also resulting in the formation of delayed ettringite.

Similar issues exist for the grouts and mortars prepared from the cements existing at the date of the invention.

It thus remains necessary to provide a cement which makes possible the preparation of a concrete, a grout or a mortar, which is resistant to internal sulfate reactions and to external sulfate attacks, while maintaining technical and mechanical characteristics, in particular the setting time and the short-time strength, which allow them to be used for the construction of civil engineering structural works and of buildings and for the manufacture of prefabricated parts.

Patent application FR 2 357 500 describes cements which make possible the preparation of concretes resistant to the majority of corrosive media, in particular concentrated nitrate and sulfate solutions. As the resistance to corrosion brought about by concentrated sulfate solutions cannot be confused with resistance to internal sulfate reactions and to external sulfate attacks, this patent application does not relate to the same issue as that which brought about the present invention. Furthermore, this patent application teaches that it is essential, in order to obtain good resistance to sulfate attacks, for the cements to comprise more than 10% of silica fume. In point of fact, the use of such amounts of silica requires the addition of a large amount of water in order to prepare the concrete, grout or mortar, which is reflected by high consistencies of said concrete, grout or mortar, requiring a high degree of admixture (superplasticizer). Moreover, silica fume is an expensive product.

Thus, at the date of the present invention, a need still exists for cements which make possible the preparation of concretes, grouts or mortars exhibiting mechanical and technical performances compatible with their use for the construction of civil engineering structural works and of buildings and for the manufacture of prefabricated parts, while strongly limiting internal sulfate reactions and external sulfate attacks.

In point of view, contrary to all expectation, it has now been found that the use of cements comprising 2% or less of $C_3A$, less than 2% of $ and 10% or less of silica fume for the preparation of a concrete but also a grout or a mortar makes it possible to strongly limit internal sulfate reactions and external sulfate attacks while maintaining the mechanical and technical performance, in particular the setting time and the short-times strength, which allows them to be used for the construction of civil engineering structural works and of buildings and for the manufacture of prefabricated parts.

Thus, the present invention relates to a cement comprising:
from 90% to 100% of a clinker comprising
from 50% to 80% of $C_3S$;
from 4% to 40% of $C_2S$;
from 0% to 20% of $C_4AF$; and
from 0% to 2% of $C_3A$;
from 0% to 10% of silica fume; and
less than 2% of $;
with the exclusion of cements comprising:
90% of clinker comprising
55% of $C_3S$;
20% of $C_2S$;
15.2% of $C_4AF$; and
1.6% of $C_3A$;
and 10% of silica fume.

The cement according to the present invention makes possible the preparation of a concrete but also of a grout or of a mortar exhibiting mechanical and technical performances, in particular a setting time and a short-times strength, which allows them to be used for the construction of civil engineering structural works and of buildings and for the manufacture of prefabricated parts, while strongly limiting internal sulfate reactions and external sulfate attacks.

In the context of the present invention, the following notations are adopted to denote the mineralogical components of the cement:
C represents CaO;
A represents $Al_2O_3$;
F represents $Fe_2O_3$;
S represents $SiO_2$; and
$ represents $SO_3$.

Thus, for example, the calcium aluminoferrite phase of a composition corresponding to the general formula $C_4AF$ corresponds in reality to a $(CaO)_4(Al_2O_3)(Fe_2O_3)$ phase.

Furthermore, in the context of the present invention, the proportions, expressed as %, correspond to percentages by weight with respect to the total weight of the entity under consideration (cement, concrete, grout or mortar).

In the context of the present invention, the contents of phases correspond to contents of phases measured by X-ray diffraction analysis in combination with the Rietveld calculation method (*A Profile Refinement Method for Nuclear and Magnetic Structures*, H. M. Rietveld, J. Appl. Cryst. (1969), and *Advances in quantitative XRD analysis for clinker, cements, and cementitious additions*, G. Walenta and T. Füllmann, International Centre for Diffraction Data, 2004, Advances in X-ray Analysis, Volume 47).

The contents thus determined differ from the contents calculated according to the Bogue calculation method (as defined in *LEA'S Chemistry of cement and concrete* (4th edition), edited by P. C. Hewlett, p. 154), which does not take into account possible minor elements present in the phases and modifications which these elements may introduce. In contrast, the X-ray diffraction analysis associated with the Rietveld calculation method makes it possible to measure the contents of phases actually present in a clinker or a cement by taking into account the modifications and the changes in crystalline phases.

BRIEF DESCRIPTION OF THE DRAWINGS

FIG. 1 is a graph of resistance to internal sulfate reactions.
FIG. 2 is a graph of resistance to external sulfate attacks.

A subject matter of the present invention is thus a cement comprising less than 2% of $. Preferably, a subject matter of the present invention is a cement as described above comprising less than 1.5% of $, more preferably less than 1% of $.

The cement according to the present invention comprises a clinker as defined above. Preferably, a subject matter of the present invention is a cement as described above comprising a clinker, following characteristics of which are chosen, alone or in combination:
the clinker comprises less than 2% of $C_3A$, preferably from 0% to 1.5% of $C_3A$, entirely preferably from 0% to 1% of $C_3A$; and/or
the clinker comprises from 65% to 80% of $C_3S$.

A subject matter of the present invention is a cement comprising from 90% to 100% of a clinker as defined above and from 0% to 10% of silica fume. Preferably, a subject matter of the present invention is a cement as described above comprising less than 10% of silica fume, more preferably from 0% to 5% of silica fume, more preferably from 0% to 2% of silica fume. Entirely preferably, a subject matter of the present invention is a cement as described above which is devoid of silica fume.

In addition to the preceding constituents, the cement according to the present invention can also comprise gypsum in order to adjust the content of $, it being understood that the latter remain below 2%.

The cement according to the present invention can be prepared by any process known to a person skilled in the art. In particular, the cement according to the present invention can be prepared by a process comprising the following stages:
crushing the starting materials;
grinding in order to obtain the raw meal;
burning up to 1450° C.;
quenching;
grinding;
optional addition, during or after the grinding, of secondary constituents, such as silica fume;
optional addition of gypsum, of anhydrite or of gypsum plaster or of a mixture of these.

The cement according to the present invention can be prepared from different starting materials, such as limestone, clays and marls, iron oxide, siliceous sand and bauxite.

Although the cement according to the present invention is particularly indicated in the preparation of concretes, it can also be used to prepare grouts or mortars. Thus, another subject matter of the present invention is a concrete, a grout or a mortar comprising a cement as described above. Preferably, a subject matter of the present invention is a concrete comprising a cement as described above.

The present invention is illustrated in a non-limited manner by the following examples.

EXAMPLE 1

Cement 1 According to the Invention

A cement of CEM I 52.5N type having the composition reported in the following table 1 was manufactured:

TABLE 1

| Constituent | % (by weight) |
|---|---|
| C | 66.31% |
| S | 21.05% |
| F | 4.89% |
| A | 3.48% |
| $ | 1.05% |
| MgO | 0.84% |
| $TiO_2$ | 0.20% |
| $P_2O_5$ | 0.19% |
| SrO | 0.10% |
| $Na_2O$ | 0.08% |
| $K_2O$ | 0.55% |
| MnO | 0.06% |

The loss on ignition (975° C.) is 1%.

The cement thus prepared comprising approximately 1% of $.

Moreover, the phase composition of this cement is as follows (values measured by X-ray diffraction analysis in combination with the Rietveld calculation method):

$C_3S$: 72%;

$C_2S$: 11%;

$C_4AF$: 13%; and $C_3A$: 0.9%.

The mechanical characteristics of the cement thus prepared were measured and are reported in table 2 below:

TABLE 2

| | |
|---|---|
| Water demand (%) | 26.5 |
| Heat of hydration at 41 h (D/g) | 245.0 |
| 28-Day shrinkage (μm/m) | 490.0 |
| Expansion (mm) | 1.0 |
| Initial setting time (min) | 200 |
| Final setting time (min) | 300 |
| CS(*) at 16 hours (MPa) | 5.1 |
| CS(*) at 2 days (MPa) | 22.3 |
| CS(*) at 7 days (MPa) | 44.8 |
| CS(*) at 28 days (MPa) | 63.3 |
| CS(*) at 90 days (MPa) | 69.9 |

(*)CS: compressive strength according to the standard NF EN 196-1

The heat of hydration of the cement of the invention is limited, which regulates the temperature rise during the setting of the concrete prepared from this cement. Furthermore, the setting time and the compressive strengths of the concrete prepared from this cement meet the requirements for the construction of civil engineering structural works and of buildings and for the manufacture of prefabricated parts.

EXAMPLE 2

Cement 2 According to the Invention

A cement of CEM I 52.5N type having the composition reported in the following table 3 was manufactured:

TABLE 3

| Constituent | % (by weight) |
|---|---|
| C | 66.66% |
| S | 21.38% |
| F | 4.89% |
| A | 3.46% |
| $ | 0.91% |
| MgO | 0.77% |
| $TiO_2$ | 0.20% |
| $P_2O_5$ | 0.17% |
| SrO | 0.10% |
| $Na_2O$ | 0.05% |
| MnO | 0.03% |

The cement thus prepared comprises approximately 0.9% of $ and 4% of silica fume.

Furthermore, the phase composition of this cement is as follows (values measured by X-ray diffraction analysis in combination with the Rietveld calculation method):

$C_3S$: 72%;

$C_2S$: 12%;

$C_4AF$: 14%; and $C_3A$: 0.8%.

The mechanical characteristics of the cement thus prepared were measured and are reported in table 4 below:

TABLE 4

| | |
|---|---|
| Water demand (%) | 28.6 |
| Heat of hydration at 41 h (D/g) | 283.1 |
| 28-Day shrinkage (μm/m) | 693.8 |
| Expansion (mm) | 0.5 |
| Initial setting time (min) | 237 |
| Final setting time (min) | 318.6 |
| CS(*) at 16 hours (MPa) | 5.3 |
| CS(*) at 1 day (MPa) | 11.4 |
| CS(*) at 2 days (MPa) | 24.5 |
| CS(*) at 7 days (MPa) | 45.0 |
| CS(*) at 28 days (MPa) | 61.7 |
| CS(*) at 90 days (MPa) | 70.0 |

(*)CS: compressive strength according to the standard NF EN 196-1

The heat of hydration of the cement of the invention is limited, which regulates the temperature rise during the setting of the concrete prepared from this cement. Furthermore, the setting time and the compressive strengths of the concrete prepared from this cement meet the requirements for the construction of civil engineering structural works and of buildings and for the manufacture of prefabricated parts.

EXAMPLE 3

Concretes Prepared from Cements According to the Invention

A first concrete and a second concrete are respectively prepared from the cements of example 1 (concrete 1) and of example 2 (concrete 2). The final compositions of these concretes are as follows:

TABLE 5

| Composition | kg/m³ |
|---|---|
| Cement | 424 |
| Total water | 201 |
| Palvadeau sand 0/0.315 | 98 |
| Palvadeau sand 0.315/1 | 180 |
| Palvadeau sand 1/4 | 189 |
| Palvadeau sand 2/4 | 202 |
| Palvadeau aggregate 4/8 | 195 |
| Palvadeau aggregate 8/12.5 | 907 |

The resistance of these concretes (concrete 1 and concrete 2) to internal sulfate reactions is studied according to the LPC method No. 66 in comparison with a concrete prepared from a conventional CEM I 52.5N PM ES cement and in accordance with the standard NF P 15-319 (concrete 3).

The object of this performance test is to determine the ability of a concrete to withstand the internal sulfate reaction; it is a test of swelling. After preparation, the concrete test specimens are subjected to a heat treatment at 80° C. in order to simulate a temperature rise. The concrete is subsequently exposed to two wetting/drying cycles (drying for 7 days in the chamber at 38° C. and HR<30%, followed by immersion for 7 days in water from the distribution network at 20+/−2° C.). The test specimens are subsequently stored in a tank of water at 20° C. and their longitudinal deformation is regularly measured.

The results observed are reported in FIG. 1.

Criterion 1 according to the LPC No. 66 method corresponds:
to the main longitudinal deformation of 3 test specimens being less than 0.04% and no individual value exceeding 0.06% at the end of 12 months;
and to the monthly variation in the main longitudinal deformation of 3 test specimens measured from the 3rd month being less than 0.004%.

Criterion 2 according to the LPC No. 66 method corresponds:
to the individual longitudinal deformation of the 3 test specimens being between 0.04% and 0.07% at the end of 12 months. It is then necessary to extend the test up to the 15th month;
and to the monthly variation in the main longitudinal deformation of 3 test specimens measured from the 12th month being less than 0.004% and the cumulative variation between the 12th and 15th month being less than 0.006%.

In contrast to the concrete prepared from a cement of CEM I 52.5N PM ES type, the concretes of the invention do not develop internal sulfate reactions.

Thus, concrete 1 satisfies criterion 1 of the LPC No. 66 method and concrete 2 satisfies criterion 2 of the LPC No. 66 method, whereas the concrete prepared from the cement of CEM I 52.5N PM type does not satisfy either of these criteria.

EXAMPLE 4

Mortars Prepared from Cements According to the Invention

A first mortar and a second mortar are prepared by respectively mixing the cements of example 1 (mortar 1) and of example 2 (mortar 2) with sand, water and a calcium sulfate admixture in order for the $ content of the mortar to be 7%.

The résistance of these mortars (mortar 1 and mortar 2) to external sulfate attacks is measured by a test carried out according to the standard ASTM C 452 in comparison with a mortar prepared from a conventional CEM I 52.5N PM ES cement and in accordance with the standard NF P 15-319 (mortar 3).

This test makes it possible to determine the expansion of a mortar by measuring the longitudinal deformation of a test specimen.

The results are reported in FIG. 2.

At 14 days, the mortars prepared from the cements according to the invention have not reached the limit set by the ASTM. Furthermore, at 430 days, the swelling is stabilized at 0.025% for mortar 1 and at 0.045% for mortar 2, whereas the swelling of the mortar prepared from the CEM I 52.5N PM ES cement is still increasing.

In contrast to the mortar prepared from a cement of CEM I 52.5N PM ES type, the mortars prepared from the cements of the invention are very insensitive to external sulfate attacks.

The invention claimed is:
1. A cement comprising:
from 90% to 100% of a clinker comprising:
from 50% to 80% of $C_3S$;
from 4% to 40% of $C_2S$;
from 0% to 20% of $C_4AF$; and
less than 1% of $C_3A$;
from 0% to 10% of silica fume; and
less than 1.5% of $.
2. The cement as claimed in claim 1, comprising less than 1% of $.
3. The cement as claimed in claim 1 wherein the clinker comprises from 65% to 80% of $C_3S$.
4. The cement as claimed in claim 1, comprising from 0% to 5% of silica fume.
5. The cement as claimed in claim 4, comprising from 0% to 2% of silica fume.
6. The cement as claimed in claim 1, further comprising gypsum.
7. A concrete comprising the cement as claimed in claim 1.
8. A grout comprising the cement as claimed in claim 1.
9. A mortar comprising the cement as claimed in claim 1.

* * * * *